Patented Sept. 9, 1952

2,610,176

UNITED STATES PATENT OFFICE 2,610,176

PREPARATION OF RIBOFLAVIN PHOSPHATE INTERMEDIATES

Leo A. Flexser, Upper Montclair, and Walter G. Farkas, Nutley, N. J., assignors to Hoffmann-La Roche Inc., Nutley, N. J., a corporation of New Jersey No Drawing. Application July 15, 1950, Serial No. 174,122

9 Claims. (Cl. 260—205)

This invention relates to the preparation of riboflavin phosphate intermediates useful in the synthesis of a stable, physiologically active monophosphoric acid ester of riboflavin. This ester, especially in the form of its salts, e. g., its sodium salt, has the very desirable property of being much more soluble than riboflavin itself, and is, therefore, of great utility for the preparation of solutions of riboflavin suitable for injection or incorporation into foods. Our invention also embraces new and useful intermediates for synthesizing the monophosphoric acid ester of riboflavin.

In our copending application Ser. No. 141,585, filed January 31, 1950, we disclose that riboflavin may be phosphorylated by chlorophosphoric acids to give various products, namely, mono(monochlorophosphoric acid) salts and mono(dichlorophosphoric acid) salts of riboflavin monoesters of phosphoric acid, polyphosphoric acids, chlorine-containing phosphoric acid, and chlorine-containing polyphosphoric acids. These phosphorylated riboflavin compounds can all be hydrolyzed to the monophosphoric acid ester of riboflavin. The new method disclosed in our aforementioned application for phosphorylating the riboflavin consists of pretreating phosphorus oxychloride ($POCl_3$) with water to form a chlorophosphoric acid in which riboflavin is soluble and whereby it is readily phosphorylated at room temperature. The chlorophosphoric acids are readily prepared by reacting phosphorus oxychloride with about one to two moles of water. The treatment of the phosphorus oxychloride with water follows the course:

$$POCl_3 + H_2O \rightarrow HOPOCl_2 + HCl$$
$$POCl_3 + 2H_2O \rightarrow (HO)_2POCl + 2HCl$$

Preferably, the reaction is carried out with an excess of phosphorylating agent and for a sufficient length of time to insure that no riboflavin remains unphosphorylated.

We have now found that certain simpler, cheaper and more readily available substances than riboflavin itself may be phosphorylated by the method disclosed in our aforesaid copending application to give new phosphorylated compounds from which the monophosphoric acid ester of riboflavin can readily be synthesized. The necessity for employing expensive riboflavin as a raw material is thereby avoided.

Thus, suitable starting materials for our new synthesis are 1-D-1'-ribitylamino-3,4-dimethylbenzene, also called ribitylxylidine, and 1-D-1'-ribitylamino-6-arylazo-3,4 - dimethyl - benzene. We have found that these compounds upon reaction with a chlorophosphoric acid followed by hydrolysis of the reaction product give monophosphoric acid esters of ribitylxylidine and of 1-D-1'-ribitylamino-6 - arylazo - 3,4 - dimethylbenzene. These may then be converted into the monophosphoric acid esters of riboflavin.

The products of the phosphorylation reaction comprise mono(chlorophosphoric acid) salts of phosphoric acid esters and chlorophosphoric acid esters of 1-D-1'-ribitylamino-3,4-dimethylbenzene and of 1-D-1'-ribitylamino-6-arylazo-3,4-dimethyl-benzene. The extent of the phosphorylation depends upon the length of time the ribitylamino compounds are allowed to react with the water-pretreated $POCl_3$. The phosphorylation reaction involving ribitylxylidine may be written schematically as follows, although we wish it to be understood that we do not intend any theoretical interpretation as a limitation on our invention. The reactions given herein set forth syntheses with postulated structures. It will be understood that although the outline given herein is based upon what we consider to be the most probable reactions, we do not wish to limit our invention to any specific theory of reaction or structure of products.

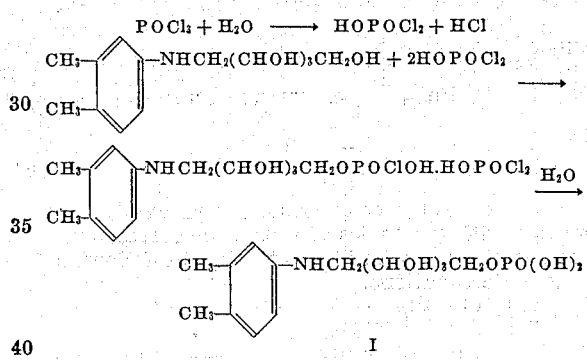

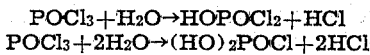

The monophosphoric acid esters of ribitylxylidine, I, can readily be coupled to aryl diazonium salts to give new and useful monophosphoric acid esters of 1-D-1'-ribitylamino-6-arylazo-3,4-dimethyl benzenes, II, as illustrated by the following schematic equations.

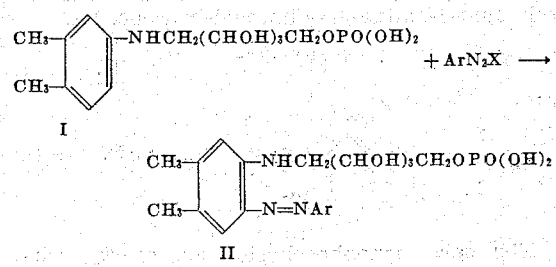

wherein $ArN_2X$ is an aryl diazonium salt such as benzene diazonium sulfate, p-nitrophenyl diazonium chloride, o- or p-chlorophenyl diazonium chloride, and the like.

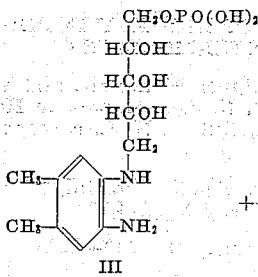

III

The aforementioned new monophosphoric acid esters of 1-D-1'-ribitylamino-6-arylazo-3,4-dimethyl benzenes, II, may also be prepared as mentioned hereinbefore by reaction of the known unphosphorylated azo compounds with a chlorophosphoric acid, as illustrated by the following schematic equation.

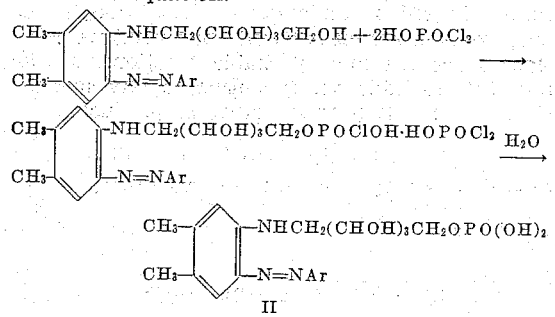

II

In the case of phosphorylating with $POCl_3$ pretreated with two moles of water, the corresponding reactions can be illustrated by the following schematic equations.

$$POCl_3 + 2H_2O \longrightarrow (HO)_2POCl + 2HCl$$
$$ROH + 2(HO)_2POCl \longrightarrow$$
$$[ROPO(OH)_2]\cdot(HO)_2POCl \xrightarrow{H_2O} ROPO(OH)_2$$

where ROH represents 1-D-1'-ribityl-3,4-dimethyl-benzene or 1-D-1'-ribityl-6-arylazo-3,4-dimethyl-benzene.

The monophosphoric acid esters of compounds, II, may be reduced as illustrated by the following equation to yield as new and useful products the monophosphoric acid esters of 1-D-1'-ribitylamino-6-amino-3,4-dimethyl-benzene, III.

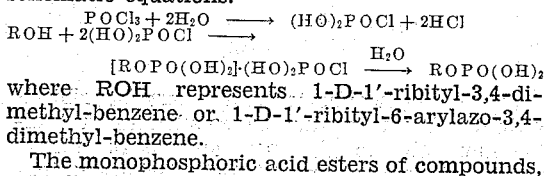

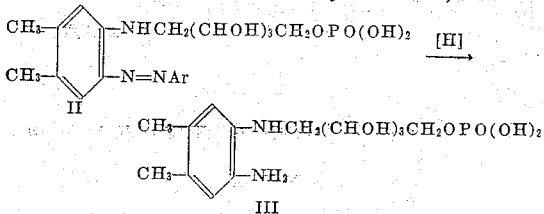

III

The new monophosphoric acid esters compounds, III, may then be condensed with alloxan, alloxantin, or mixtures thereof to give monophosphoric acid esters of riboflavin, IV, the reaction being schematically illustrated as follows:

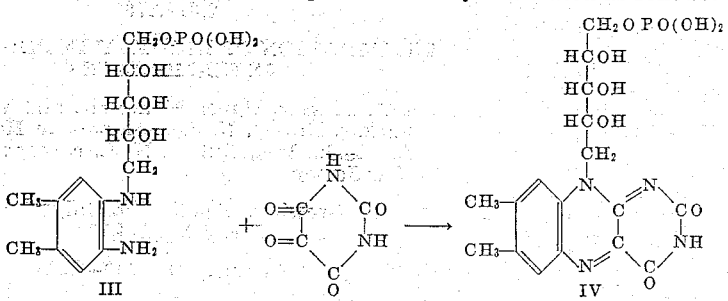

Alternatively, the riboflavin monophosphoric acid esters can be prepared more directly by reacting the monophosphoric acid esters of the 1-D-1'-ribitylamino-6-arylazo-3,4-dimethyl benzenes, II, with barbituric acid as schematically illustrated by the following equation.

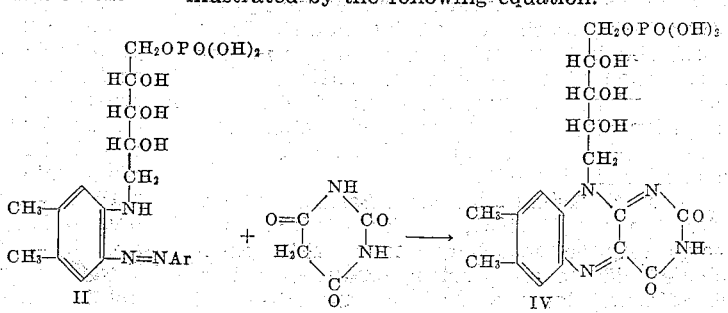

It is to be understood that all the above reaction equations are intended to be illustrative of the reactions involved and not to restrict the scope of our invention. The illustrated reactions for example, indicate the phosphate ester group to be on carbon No. 5' of the ribityl chain. The phosphate group may, however, in accordance with our invention, be on any of the available positions of the ribityl chain although the 5' position is preferred because of the identity of riboflavin-5'-monophosphoric acid ester with the component of the natural riboflavin-enzyme system.

The extent of the phosphorylation of the ribitylxylidine and 1-D-1'-ribitylamino-6-arylazo-3,4-dimethyl-benzene makes no difference as in all cases the hydrolysis product is the monophosphoric acid ester of the intermediates. While the aforementioned chlorophosphoric acid and phosphoric acid esters of the intermediates may be isolated for purposes of purification it is not necessary to effect such isolation for the preparation of the final riboflavin monophosphoric acid ester. The reaction mixture after phosphorylation of the intermediates by the water-pretreated $POCl_3$ is simply added to several volumes of water, and allowed to stand for several hours. During this time the residual, unreacted, water-pretreated $POCl_3$ is completely hydrolyzed to phosphoric and hydrochloric acids and the intermediate ester salts undergo hydrolysis to form the monophosphoric acid esters of the intermediates. The latter compounds can then readily be converted into the riboflavin monophosphoric acid ester.

The following examples will serve to illustrate the synthesis of our new and useful monophosphoric acid esters of ribitylxylidine, 1-D-1'-ribitylamino-6-arylazo-3,4-dimethyl-benzenes, and 1-D-1'-ribitylamino-6-amino-3,4-dimethyl-benzene, and their conversion into riboflavin monophosphoric acid ester. The examples are intended only to illustrate and not to restrict the scope of our invention.

EXAMPLE 1

*Monophosphoric acid ester of 1-D-1'-ribitylamino-3,4-dimethyl-benzene*

To 61.3 grams (0.4 mole) of phosphorus oxychloride were added slowly, with good agitation and with cooling to about room temperature, 7.2 grams (0.4 mole) of water. The mixture was stirred until evolution of hydrogen chloride gas appeared mostly finished and allowed to stand overnight (about 16 hours). Then 5.1 grams (0.02 mole) of 1-D-1'-ribitylamino-3,4-dimethyl-benzene (ribitylxylidine) were added with stirring. Solution occurred and HCl gas was evolved. The solution was agitated at room temperature for six hours. With cooling there were added 500 cc. of anhydrous ether. An oil separated which hardened upon trituration with fresh ether. This substance was boiled with 250 cc. of water in order to effect hydrolysis to the stable monophosphoric acid ester. The aqueous solution thereby obtained was evaporated in vacuo to a small volume and several parts of acetone were added. The monophosphoric acid ester of 1-D-1'-ribitylamino-3,4-dimethyl-benzene precipitated as an oily solid which hardened on standing. It was filtered, washed with acetone and ether and dried in vacuo. The substance is very hygroscopic and in contradistinction to ribitylxylidine itself, is highly water-soluble at room temperature. Upon potentiometric titration with sodium hydroxide it gave an inflection point at about pH 9 when two equivalents of the alkali had been added.

When the monophosphoric acid ester of ribitylxylidine is to be employed for the production of riboflavin monophosphoric acid ester, it is not necessary to isolate the compound in the solid form. An aqueous solution of the compound suitable for conversion into riboflavin monophosphoric acid ester was obtained by repeating the phosphorylation procedure and pouring the phosphorylation reaction solution into several volumes of water (instead of adding ether) and neutralizing the resulting solution to about pH 3 with caustic soda.

EXAMPLE 2

*Monophosphoric acid ester of 1-D-1'-ribitylamino-3,4-dimethyl-6-phenylazo-benzene*

To the aqueous solution of the monophosphoric acid ester of ribitylxylidine obtained as described in the final paragraph of Example 1 was added an equivalent quantity of benzene diazonium chloride solution obtained by diazotizing aniline with sodium nitrite in the presence of hydrochloric acid. The temperature was kept between 10° and 20° C. Red crystals of the monophosphoric acid ester of 1-D-1'-ribitylamino-3,4-dimethyl-6-phenylazo-benzene began to precipitate in about 5 minutes. The pH was maintained at about 3 for about 6 hours by occasional addition of sodium acetate. The red crystals were then filtered off and washed with saturated sodium chloride solution until free of inorganic phosphates and air dried. This mixture of sodium chloride and monophosphoric acid ester of 1 - D -1' - ribitylamino -3,4 - dimethyl - 6 - phenylazo-benzene is suitable for conversion into the monophosphoric acid ester of riboflavin without further purification. The pure monophosphoric acid ester of 1-D-1'-ribitylamino-3,4-dimethyl-6-phenylazo-benzene was obtained by extracting the mixture with butyl alcohol, evaporating to a small volume and precipitating with ether. The product so obtained gave upon potentiometric titration with sodium hydroxide a sharp point of inflection at about pH 9 upon addition of two moles of the alkali.

EXAMPLE 3

*Alternative preparation of monophosphoric acid ester of 1-D-1'-ribitylamino-3,4-dimethyl-6-phenylazo-benzene*

To 122.6 grams (0.8 mole) of phosphorus oxychloride were added slowly with good agitation and with cooling to about room temperature, 14.4 grams (0.8 mole) of water. The mixture was stirred until evolution of hydrogen chloride gas appeared mostly finished and allowed to stand overnight. Then 7.18 grams (0.02 mole) of 1 - D - 1' - ribitylamino - 3,4 - dimethyl - 6 - phenylazo - benzene were added with stirring. Solution occurred and HCl gas was evolved. The solution was agitated at room temperature for six hours. It was then slowly poured into 300 cc. of water. The temperature rose to 80–85° C., thereby effecting hydrolysis to the stable monophosphoric acid ester of 1-D-1'-ribitylamino-3,4-dimethyl - 6 - phenylazo - benzene. The solution was then cooled and neutralized to pH 2.5 by cautious addition of sodium hydroxide. The monophosphoric acid ester of 1-D-1'-ribitylamino - 3,4 - dimethyl - 6 - phenylazo - benzene crystallized. It was filtered off and washed with saturated sodium chloride solution until free from inorganic phosphates and air dried. In contradistinction to the parent unphosphorylated compound, the monophosphoric acid ester is highly soluble in aqueous sodium hydroxide solution.

A pure barium salt was prepared by suspending the sodium chloride-1-D-1'-ribitylamino-3,4-dimethyl - 6 - phenylazo - benzene monophosphoric acid ester mixture in water, bringing the pH to 9 with sodium hydroxide to effect solution and adding barium chloride solution. The insoluble barium salt of the monophosphoric acid ester precipitated and was filtered off, washed chloride-free with water, then with alcohol and ether and dried. The substance contained 5.53 per cent phosphorus (theory for $C_{19}H_{24}O_7N_3PBa = 5.4\%$).

EXAMPLE 4

*Monophosphoric acid ester of 1-D-1'-ribitylamino-3,4-dimethyl-6-amino-benzene*

3.0 grams of the barium salt of the monophosphoric acid ester of 1-D-1'-ribitylamino-3,4-dimethyl - 6 - phenylazo - benzene obtained as described in the final paragraph of Example 3, were suspended in 50 cc. of water and 5 cc. of 1N sulfuric acid were added to liberate the free ester. 1.0 gram of palladium-charcoal catalyst was added and the mixture hydrogenated at 70° C. under a pressure of 500 lbs./sq. in. for two hours. The catalyst and barium sulfate were filtered off. The solution obtained was now practically colorless indicating complete reduction of the 1 - D - 1' - ribitylamino - 3,4 - dimethyl - 6 - phenylazo-benzene. The solution was made alkaline with NaOH, and the water and aniline formed were distilled off under vacuum. Upon addition of alcohol to the residue, the sodium salt of the monophosphoric acid ester of 1-D-1'- ribitylamino - 3,4 - dimethyl - 6 - amino - benzene precipitated.

EXAMPLE 5

*Monophosphoric acid ester of riboflavin*

The suspension in alcohol of the sodium salt of the monophosphoric acid ester of 1-D-1'-ribitylamino - 3,4 - dimethyl - 6 - amino - benzene obtained as described in Example 4, was acidified with concentrated HCl and heated to reflux. Two grams of alloxantin were added and the mixture boiled under reflux with stirring for five hours. The typical yellow color and fluorescence of riboflavin monophosphoric acid ester developed. The solution was cooled, water added, and unreacted alloxantin removed by filtration. The ester was adsorbed on fuller's earth which was then washed thoroughly with water. The ester was eluted with sodium hydroxide, giving a solution of the sodium salt of riboflavin monophosphoric acid ester containing no inorganic phosphates. Instead of employing alloxantin in the reaction, alloxan or a mixture of alloxan and alloxantin may be used.

EXAMPLE 6

*Alternative preparation of riboflavin monophosphoric acid ester*

A solution of .01 mole in 94 cc. of water of the monosodium salt of the monophosphoric acid ester of 1-D-1'-ribitylamino-3,4-dimethyl-6-phenylazo-benzene was prepared by adding .01 mole of NaOH to an aqueous suspension of .01 of a mole of the free ester-sodium chloride mixture obtained as described in Example 3. 30 grams of sodium chloride were added thereto resulting in precipitation of the monosodium salt of the monophosphoric acid ester of the 1-D-1'-ribitylamino-3,4-dimethyl-6-phenylazo - benzene which was filtered off, washed with saturated NaCl solution and air-dried. The dried product was refluxed with 3 grams of barbituric acid in a mixture of 62 cc. of dioxane and 12 cc. of glacial acetic acid for 6½ hours. The reaction mixture was then cooled and filtered from unreacted materials. The filtrate had the typical fluorescence of riboflavin monophosphoric acid ester. The substance was isolated by addition of barium chloride solution and filtration of the resultant precipitate of the slightly soluble barium salt of riboflavin monophosphoric acid ester.

We claim:

1. A process of phosphorylation which comprises reacting a member selected from the group consisting of 1-D-1'-ribitylamino-3,4-dimethyl-benzene and 1-D-1'-ribitylamino-6-phenylazo-3,4-dimethyl-benzene with a member selected from the group consisting of the two acids represented by the formulae $(HO)_2POCl$ and $HOPOCl_2$.

2. A process of phosphorylation which comprises reacting a member selected from the group consisting of 1-D-1'-ribitylamino-3,4-dimethyl-benzene and 1-D-1'-ribitylamino-6-phenylazo-3,4-dimethyl-benzene with the acid represented by the formula $(HO)_2POCl$.

3. A process of phosphorylation which comprises reacting a member selected from the group consisting of 1-D-1'-ribitylamino-3,4-dimethyl-benzene and 1-D-1'-ribitylamino-6-phenylazo-3,4-dimethyl-benzene with the acid represented by the formula $HOPOCl_2$.

4. A process of phosphorylation which comprises reacting a member selected from the group consisting of 1-D-1'-ribitylamino-3,4-dimethyl-benzene and 1-D-1'-ribitylamino-6-phenylazo-3,4-dimethyl-benzene with a member selected from the group consisting of the two acids represented by the formulae $(HO)_2POCl$ and $HOPOCl_2$, and hydrolyzing the reaction product to produce the corresponding 5'-monophosphoric acid ester.

5. A process of phosphorylation which comprises reacting a member selected from the group consisting of 1-D-1'-ribitylamino-3,4-dimethyl-benzene and 1-D-1'-ribitylamino-6-phenylazo-3,4-dimethyl-benzene with the acid represented by the formula $(HO)_2POCl$, and hydrolyzing the reaction product to produce the corresponding 5'-monophosphoric acid ester.

6. A process of phosphorylation which comprises reacting a member selected from the group consisting of 1-D-1'-ribitylamino-3,4-dimethyl-benzene and 1-D-1'-ribitylamino-6-phenylazo-3,4-dimethyl-benzene with the acid represented by the formula $HOPOCl_2$, and hydrolyzing the reaction product to produce the corresponding 5'-monophosphoric acid ester.

7. Riboflavin phosphate intermediates produced according to the process of claim 1.

8. Riboflavin phosphate intermediates produced according to the process of claim 2.

9. Riboflavin phosphate intermediates produced according to the process of claim 3.

LEO A. FLEXSER.
WALTER G. FARKAS.

REFERENCES CITED

The following references are of record in the file of this patent:

UNITED STATES PATENTS

| Number | Name | Date |
|---|---|---|
| 2,111,491 | Kuhn et al. | Mar. 15, 1938 |
| 2,224,695 | Prutton | Dec. 10, 1940 |
| 2,350,376 | Tishler et al. | June 6, 1944 |
| 2,370,093 | Tishler | Feb. 20, 1945 |
| 2,374,661 | Bergel et al. | May 1, 1945 |
| 2,472,007 | Farkas et al. | May 31, 1949 |
| 2,535,385 | Breivogel | Dec. 26, 1950 |

OTHER REFERENCES

Gerrard, Chemical Abstracts, vol. 39, 1945, page 2734.